United States Patent
Das

(10) Patent No.: US 9,378,438 B2
(45) Date of Patent: Jun. 28, 2016

(54) CALCULATION OF TRAPPING PARAMETERS

(71) Applicant: XEROX CORPORATION, Norwalk, CT (US)

(72) Inventor: Apurba Das, West Bengal (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/292,343

(22) Filed: May 30, 2014

(65) Prior Publication Data

US 2015/0347880 A1     Dec. 3, 2015

(51) Int. Cl.
*G06K 15/02*     (2006.01)
*G06T 1/00*     (2006.01)
*H04N 1/60*     (2006.01)
*G06K 15/00*     (2006.01)

(52) U.S. Cl.
CPC .............. *G06K 15/1826* (2013.01); *G06T 1/00* (2013.01); *H04N 1/60* (2013.01); *G06K 15/005* (2013.01)

(58) Field of Classification Search
USPC ........... 358/3.24, 1.9; 382/173, 199, 264, 286
See application file for complete search history.

(56) References Cited

U.S. PATENT DOCUMENTS

| 2003/0086608 A1* | 5/2003 | Frost et al. .................... 382/173 |
| 2008/0007752 A1* | 1/2008 | Gandhi et al. ................ 358/1.9 |
| 2015/0016712 A1* | 1/2015 | Rhoads et al. ................ 382/154 |

OTHER PUBLICATIONS

Alexander Toshev et al., "Shape-based Object Detection via Boundary Structure Segmentation", CVPR 2010, pp. 1-24.
Jukka Iivarinen et al., "Comparison of Combined Shape Descriptors for Irregular Objects", British Machine Vision Conference 1997, pp. 1-10.
Charles T. Zahn et al., "Fourier Descriptors for Plane Closed Curves", IEEE Transactions on Computers, vol. C-21, No. 3, Mar. 1972, pp. 269-281.

* cited by examiner

*Primary Examiner* — Quang N Vo
(74) *Attorney, Agent, or Firm* — MH2 Technology Law Group LLP

(57) ABSTRACT

This disclosure relates to a method and apparatus for implementing a trapping operation on a digital image during image processing and prorating the size of trap color filter with respect to local irregularity in shape of any target object. Some examples of the present disclosure calculate a plurality of prorated trapping parameters to be applied to portions of an object in a printing process, the calculation being based on repeated generation and application of a 2D Gaussian mask to a binarized object to identify disappeared portions of the object. The calculated plurality of prorated trapping parameters may be applied to the object during the printing process.

14 Claims, 9 Drawing Sheets

CALCULATION OF TRAPPING PARAMETERS

FIELD OF THE DISCLOSURE

One or more of the presently disclosed examples is related to trapping techniques to prevent visual gaps or overlaps between colors in printed/copied images.

BACKGROUND OF THE DISCLOSURE

In order to print a color image, a copier or printer separates the image into primary ink colors, such as cyan, magenta, yellow, and black (CMYK). The copier or printer then prints layers of the primary inks separately one on top of the other to reproduce the full variety of colors in the image. This process is known as process color separation.

During process color separation, the printer or copier must accurately register the boundaries between adjacent colored areas. Unfortunately, accurate registration of color separation boundaries is difficult. Mis-registration of boundaries between colors often results in undesirable defects, such as gaps or overlaps, in the printed image.

In addition to color mis-registration, other types of errors can also occur during color printing. For example, "halo" effect errors can appear in a printed image as a side-effect of the xerographic marking process. As the term implies, "halo" effect is where a halo (or gap) appears at the interface between two colored regions. Mis-registration and halo are examples of a general class of errors described as "adjacency errors" which affect the boundary regions of adjacent colors.

For example, FIG. 1A illustrates an image 100 and examples of how a copier or printer may reproduce it. As shown, image 100 includes a first colored square area 104 that is surrounded by a second colored area 102. Image 106 is one example resulting from an error in the colored areas in image 100. This error may be due to color mis-registration, halo effect error, or a combination of both. As shown, image 106 may include a halo effect error, which can be seen as a space or gap 108. As another example, image 110 includes a gap 112 and a dark overlap area 114 that has been caused by a color mis-registration error of colored area 104 relative to colored area 102.

Trapping is one technique that may be used to compensate for color mis-registration. In general, trapping parameters are designed to overcompensate for an error because gaps between colored areas are considered highly undesirable. Thus, in conventional trapping, the colored areas 102 and 104 are intentionally grown or expanded into each other to fill in any gaps, such as gaps 108 or 112. For example, image 116 illustrates how trapping may be used to compensate for color mis-registration error shown in image 110.

Unfortunately, conventional trapping causes its own side effects, such as dark colored area 118, to appear in image 116. These dark colored areas are also undesirable. However, as long as these dark colored areas can be minimized, they are considered preferable over gaps (e.g., areas 108 or 112) at least in the case of these darker colors.

FIG. 1B depicts an example object having at least irregular portions 130, 132, 134 and 136. These portions are considered irregular as they have a thickness that is different from other portions of the object. During a printing process, as the trap width is typically uniformly applied, the trap width may by more visible than in other areas of the object. As can be seen, the trap width 131 surrounding object portion 130 degrades the image quality.

Conventionally, trapping parameters are determined for use across a group or fleet of copiers or printers. Typical trapping parameters may account for variations that can exist across a fleet of printers or copiers. That is, a conventional trapping parameter will specify growth of a colored area in both directions along an axis, such as both left and right (or +/−x) and both up and down (or +/−y). This allows a trapping parameter to correct for errors in virtually any situation and direction. However, this conventional approach to trapping tends to overcompensate for errors and fails to minimize the side effects of trapping, such as dark areas 114 and 118.

SUMMARY OF THE DISCLOSURE

In accordance with some examples of the present disclosure, a method of determining a set of trapping parameters for a device is provided. The set of trapping parameters may be utilized during the printing process.

In accordance with some examples of the present disclosure, methods, apparatus, systems, and non-transitory storage media, storing instructions to perform a method are provided to convolve a binarized object with a first 2D Gaussian mask based on a determined trap width; compare the convolved binarized object with the binarized object; determine that a first portion of the binarized object disappeared based on the comparison; and calculate and storing a first set of trapping parameters to be applied to the disappeared portion of the binarized object.

In accordance with some examples of the present disclosure, methods, apparatus, systems, and non-transitory storage media, storing instructions to perform a method are provided, to calculate a plurality of prorated trapping parameters to be applied to portions of an object in a printing process, the calculation being based on repeated generation and application of a bank of scaled 2D Gaussian masks of different size and variance to a binarized object to identify disappeared portions of the object; and apply the calculated plurality of prorated trapping parameters to the object during the printing process.

Additional features of some examples of the disclosure will be set forth in part in the description which follows, and in part will be obvious from the description, or may be learned by practice of the disclosure. The features of some examples of the disclosure can be realized and attained by the elements and combinations set forth in the appended claims.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate some examples of the disclosure and together with the description, may serve to explain the principles of the disclosure.

DETAILED DESCRIPTION

In the printing systems where the quality of printing is minutely examined, different types of object optimized rendering (OOR) filters (for example, trapping filters, anti-aliasing filters, etc.) may be employed to improve the image quality (IQ) of objects, for example, graphics, text, image object, jagging effect of curvy text, graphics, etc. As an example, to handle the problem of mis-registration, trapping filters may be used with a user defined trap width. The user defined trap width may not consider the size of the object the trap width is being applied to. If user selects a large width (for example, 20 pixels) for the complete document/page, the trap widths should be adaptive with respect to object size. In other words, the trap width should be prorated for smaller texts and graphics. If the trap width is not prorated, the trap color width becomes an overload to the object size and the printing quality is degraded. For example, in some printers, uniformly applied trap width prorating may be performed. But for texts and graphics of irregular shape and asymmetric (height and width) shape, the concept of uniform trap width prorating may be improved for text and graphic objects with irregular shape in order to avoid the trap width creating some visual artifacts. As discussed herein, irregularity of an object's shape may be identified and measured in a calibrated way in order to provide an adaptive OOR filter. Thus, the trap width prorating may be performed based on the object shape.

Some examples of the present disclosure provide an adaptive shape object optimized rendering filter (ASOOR) that may be adaptive with respect to the object shape and a user defined filter size (for example, trap color width). The filter involves a process to calculate and store a set of trapping parameters. The process includes convolving a binarized object with a 2D Gaussian mask based on a determined trap width. The convolved binarized object may be compared with the binarized object to determine whether a portion of the binarized object disappeared. If a portion of the binarized object disappeared, an element of the first set of trapping parameters to be applied to that portion of the object that disappeared may be calculated and stored.

Figure 2:
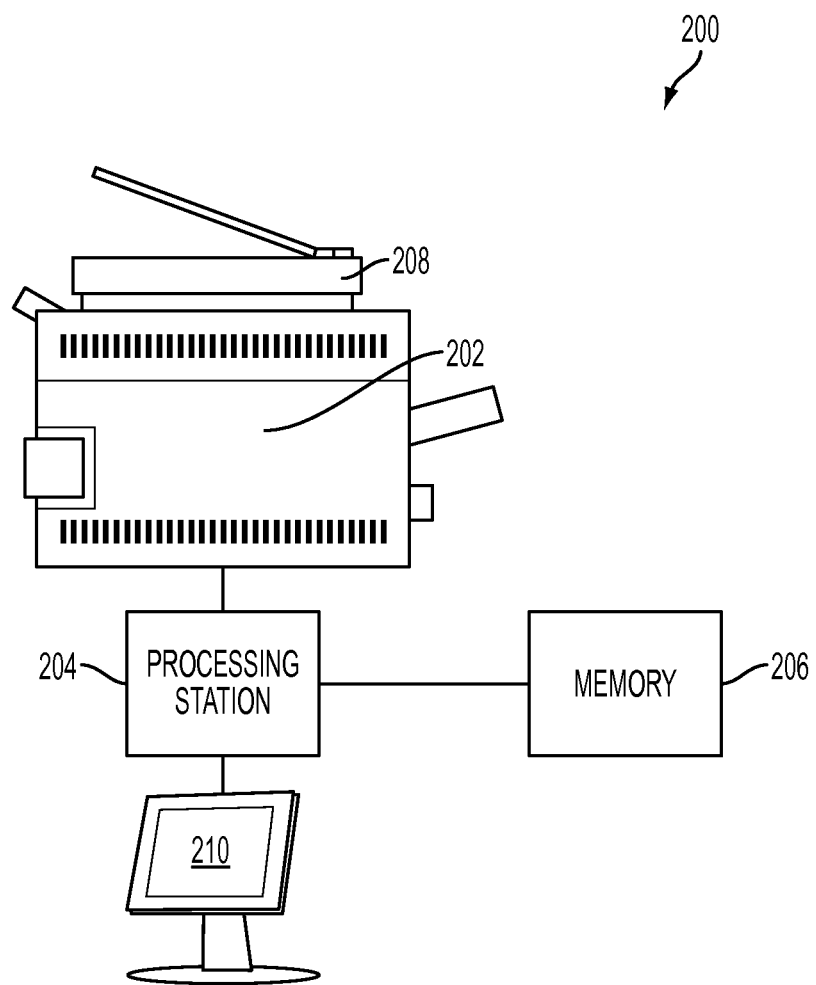
FIG. 2 illustrates an exemplary system that is consistent with some examples of the present disclosure.

FIG. 2 illustrates an example printing system 200 that is consistent with some examples of the present disclosure. For example, system 200 can be implemented as a xerographic printing or copying device. Accordingly, system 200 can print or copy a reproduction of an image in two or more colors. It may be appreciated that any type of printing or imaging device can be implemented in system 200.

System 200 may encode images based on either analog or digital representations of the image. For example, system 200 may encode images based on determining picture elements (i.e., "pixels") in each image. System 200 may determine pixels of an image by gathering data generated from a photo sensor cell when scanning a physical image. In some examples, system 200 obtains pixels of an image through line by line scanning of the image by one or more photosensitive elements, such as a multiple photo sensor array of charge couple devices (CCDs). System 200 can also receive or derive data and pixels of an image from a computer (not shown) that is executing a document creation application, such as Microsoft Word™, from a data storage device (not shown), or other applications. System 200 may be coupled to these devices, for example, via a network or some other communications channel.

System 200 may then reproduce the image onto a hardcopy medium by rendering the pixels of the image based on a variety of technologies, such as a laser, toner, or ink droplet. In some examples, system 200 may reproduce a color image based on a color separation process. For example, system 200 can use the well known CYMK color separation process. System 200 may also use other rendering techniques to reproduce or print an image, such as spot color separation.

The components of some examples of system 200 will now be described. As shown, system 200 may include a printing section 202, a processing station 204, a memory 206, a raster input section (RIS) 208, and a user interface 210.

Printing section 202 includes components of hardware and software that are used to print an image onto a hardcopy medium, such as paper, film, etc. For example, printing section 202 can be implemented as a digital color printer, a digital copier, digital press, an ink-jet printer, a xerographic printer, or other type of known printing or imaging device. As noted above, printing section 202 may use the well known CYMK color separation process in order to print color images. However, any type of printing process may be used by printing section 202.

Printing section 202 is implemented using well known components of hardware and software. In some examples, printing section 202 may suffer from color registration errors or halo effect errors when reproducing an image onto a hardcopy medium. For example, printing section 202 may have a color registration error that results in a gap or overlap between two regions of color in an image. As another example, printing section 202 may also suffer from halo effect errors. However, in various examples, printing section 202 or processing station 204 may compensate for these errors, either individually or collectively, based on trapping parameters that are determined in accordance with the principles of the present disclosure as discussed herein.

Processing station 204, utilizing one or more processors (not shown) manages and controls the operation of system 200. For example, processing station 204 may prepare image data that is to be output into hardcopy form by printing section 202. Processing station 204 can also create, modify, store, and/or otherwise process images, which will be output by printing section 202. In some examples, processing station 204 can include software, firmware, or hardware to perform trapping operations that account for the errors suffered in printing section 202 as discussed herein. Software and/or firmware may be stored, for example, in memory 206, or other memory (now shown). Memory storing the software and/or firmware may be implemented as storage device(s) that may comprise a combination of non-transitory, volatile or non-volatile memory such as random access memory (RAM) or read only memory (ROM). Such storage devices may be embodied using any currently known media such as magnetic or optical storage media including removable media such as floppy disks, compact discs, etc. One or more storage devices has stored thereon instructions that may be executed by the one or more processors, such that the processor(s) implement the functionality described herein. In addition, or alternatively, some or all of the software-implemented functionality of the processor(s) may be implemented using firmware and/ or hardware devices such as application specific integrated circuits (ASICs), programmable logic arrays, state machines, etc.

For example, processing station 204 can be configured to determine whether a selected pixel includes multiple colors, determine the boundaries between color separations, and determine the colors present in the selected picture element. Processing station 204 may then determine whether a trapping operation should be performed to compensate for errors by printing section 202, and determine which trapping color should be used for the trapping operation.

In addition, processing station 204 can receive information about the position of a digital raster image and analyze its hardcopy produced by printing section 202 to determine the color registration error or halo effect error (if any) of printing section 202. Processing station 204 can be implemented using well known components and may be configured using any combination of software, firmware, and hardware.

Although FIG. 2 shows processing station 204 directly connected to the other components of system 200, processing station 204 may be indirectly coupled to the components of system 200. For example, processing station 204 can include a communications device to facilitate information transfer to and from the components of system 200 and another computer or system. Processing station 204 may communicate with a remote diagnostic computer (not shown) to make an automatic service call in response to a detected problem.

Memory 206 serves as a storage area for system 200. For example, memory 206 can store one or more images having test patterns or test features that are printed by printing section 202 into hardcopy form. Memory 206 also provides storage for loading specific programs, such as diagnostic programs, and storage for data, such as machine history data, fault data, machine physical data, and specific machine identity information. In addition, memory 206 can store image quality analysis software that is executed by processing station 204 to analyze the printing accuracy of system 200.

Memory 206 can also store sets of tables that support trapping operations by system 200. These tables (not shown) can include stored color pairs corresponding to the colors that define the edge and a flag to indicate whether these pairs require trapping. For example, if a table entry has colors that need trapping, it can be marked as an entry in the table or through an auxiliary data structure, and one or more intermediate trapping color or colors can be indicated by these tables. In addition, the shape of the pixels along the edge that require a trapping color can be calculated or determined by using a table look-up from memory 206. Memory 206 may further store trap width information, for example, sets of trap widths, utilized for applying Gaussian masks as more fully discussed below.

Raster input section (RIS) 208 forms a digital raster image from a hardcopy sample or document and feeds the digital raster image to printing section 202. In some examples, RIS 208 captures an image, converts it to a series of raster scan lines, and measures a set of primary color densities, i.e., red, green, and blue densities, at each point of a document. Accordingly, in some examples, RIS 208 can obtain data from a hardcopy test image that indicates the printing accuracy of system 200 and printing section 202.

RIS 208 can be implemented using known components, such as document illumination lamps, optics, a mechanical scanning drive, and a charge coupled device (CCD) array or full width scanning array, etc. For example, RIS 208 can be implemented as a flat bed scanner. RIS 208 may be coupled directly to the other components of system 200, such as printing section 202, for example, via a bus, or may be indirectly coupled to the other components of system 200, for example, via a network.

User interface 210 uses operating software stored in memory 206 to operate the various machine components in an integrated fashion to produce copies and prints. For example, user interface 210 can be coupled to processing station 204. In some examples, user interface 210 enables an operator to control and monitor various operator adjustable functions and maintenance activities of system 200. User interface 210 may further provide the user with a user interface to input information including trap width information in fast scan and/or slow scan directions for generating and/or applying trap width parameters as discussed herein. For example, user interface 210 can be a touch screen, or any other suitable control panel that permits control of the operation of printing section 202. User interface 210 can be any type of suitable visual display, such as a cathode ray tube (CRT), flat screen, etc.

It may be appreciated that FIG. 2 illustrates an example of system 200 as a digital copier machine. Other components of such a machine are well known to those skilled in the art, and thus, for the purpose of brevity, further detailed description thereof is unnecessary for these known components.

It should also be understood that a loosely coupled printing or reproducing system is also applicable for use with the examples described herein, such as a printer or facsimile device. Moreover, examples of the disclosure are also applicable to a printer used in conjunction with a stand-alone scanner, such as a flatbed type scanner.

Figure 3:
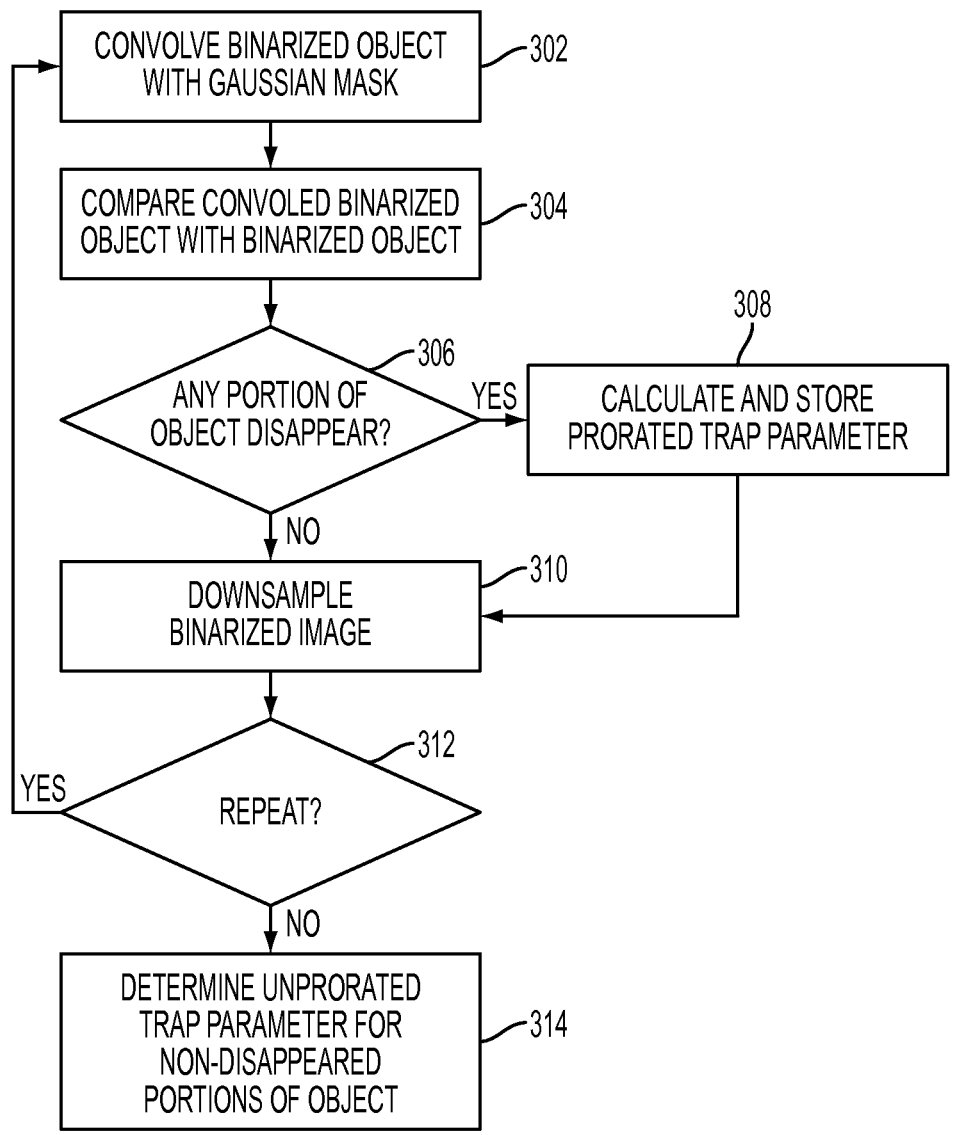
FIG. 3 illustrates an exemplary process flow to determine a set of trapping parameters in accordance with examples of the present disclosure.

FIG. 3 depicts an example process for determining trap parameters for an object. The process depicted in FIG. 3 may be performed, for example, by processing station 204.

The process in FIG. 3 utilizes a binarized object. A binarized object may be generated by segregating the object from a background in an image by a figure-ground segregation process, for example, binarization by hard thresholding.

Further, the process utilizes Gaussian masks, for example, unskewed (symmetric) 2D Gaussian masks which handles irregularity in any arbitrary direction. The size of the Gaussian masks may be determined from a set of OOR filters that may be generated from a determined trap width. The trap width may be determined based on a trap width defined by a user, for example, via a user interface. The determined trap width may be, for example, in the form of a trap width in the fast scan (trapDist.f) and slow scan direction (trapDist.s). Multiple arrays of trap widths may be generated based on the determined trap width. According to some examples, two arrays of trap widths of length 32 each, with normalized trap width from the determined trap width (max) to 0.

For i=0 to 31, trapRadiusF[i]=(int)(1.0−(float)i/31)*trapDist.f); and
trapRadiusS[i]=(int)(1.0−(float)i/31)*trapDist.s).

As the process proceeds and is repeated, as discussed below, a 2D Gaussian mask may be generated based on the trap widths stored in each of the generated arrays.

The size j of the mask may be set, where j is an integer.

Figure 4:
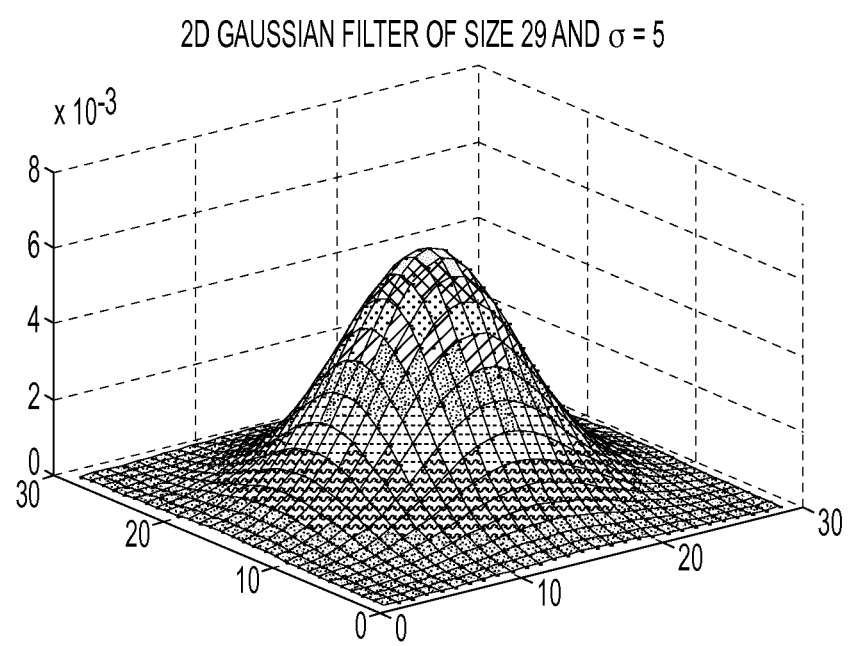
FIG. 4 illustrates an example 2D Gaussian filter, in accordance with some examples of the present disclosure.

As shown in FIG. 3, the binarized object is convolved with the 2D Gaussian mask 302. The 2D Gaussian mask may be of size=min(trapRadiusF[j], trapRadiusS[j]), σ=size/3. An example of a 2D Gaussian mask that may be applied during one iteration is depicted in FIG. 4. As can be seen in FIG. 4, the size of the 2D Gaussian mask is 29, where σ=5. The convolved object may then be binarized.

The convolved binarized object may be compared with the binarized object 304. A determination may be made as to whether a portion of the binarized object disappeared based on the comparison 306.

If a portion of the binarized object disappeared (306, YES), a prorated trap parameter may be calculated and stored 308. The prorated trap parameter may be calculated as follows: trapRadiusS[j], trapRadiusF[j]. The prorated trap parameter may be stored and associated with the portion of the binarized object that disappeared. In other words, if a portion of the binarized object disappeared, the disappeared portion may be considered an irregularity in the object. The prorated trap parameter that is stored may be applied solely to the identified disappeared, or irregular, portion of the binarized object, thereby effectively calibrating the trap width to specifically address the irregularity in the object. Processing may proceed to 310.

If a portion of the binarized object did not disappear (306, NO), processing proceeds to 310.

The binarized object may be down-sampled 310. For example, the binarized object may be down-sampled by a factor of, for example, two, by selecting every other pixel. Further, the value of j may be adjusted where j=j−1.

A determination may be made as to whether processing should be repeated starting at 302, or if processing should proceed to 314. This determination may be made by comparing the number of times steps 302-310 were repeated without any portions of the binarized object disappearing with a predetermined threshold value. The predetermined threshold value may be set by default, or may be set via the user interface.

If it is determined that the process should be repeated, as the number of times steps 302-310 were repeated without any portions of the binarized object disappearing did not exceed the predetermined threshold value (312, YES), processing proceeds to 302. At step 302, the 2D Gaussian mask size and variance (σ) may be recalculated based on the new size of the object according to the formula discussed above, and the previously convolved binarized object may be convolved with the newly calculated 2D Gaussian mask and binarized to produce a new convolved binarized object. At 304, the new convolved binarized object is compared with the old convolved binarized object (produced during the first iteration of the process) to identify further portions of the binarized object that may be disappeared. Processing proceeds as discussed above.

If it is determined that the process should not be repeated, as the number of times steps 302-310 were repeated without any portions of the binarized object disappearing did exceed the predetermined threshold value (312, NO), processing proceeds to 314.

An un-prorated trap parameter is determined for the remaining object portions 314. In other words, for those portions of the object that did not disappear during the processing, an un-prorated trap width parameter (trapRadiusS[j], trapRadiusF[j]) may be calculated and stored. The un-prorated trap parameter may be applied to those portions of the object that did not disappear during the processing during the printing process.

As a result of completing the process depicted in FIG. 3, prorated trap parameters may be determined for irregular portions of the object and an unprorated trap parameter may be determined for the remainder of object. These trap parameters may be applied to the object during a printing process.

Figure 5A:
FIGS. 5A-5F illustrates an object during various stages of processing discussed with regard to FIG. 3, in accordance with examples of the present disclosure.

FIGS. 5A-5F depicts an object during various stages of processing discussed with regard to FIG. 3. As shown in FIG. 5A, an object is depicted after figure-ground segregation. As can be seen in FIG. 5A, the object has thin and thick variations of widths in different arbitrary directions. As discussed with regard to FIG. 3, the object depicted in FIG. 5A is a binarized object.

Figure 5B:

FIG. 5B depicts the object in FIG. 5A after it has been convolved using a 2D Gaussian mask.

Figure 5C:

FIG. 5C depicts the object after it has been downsampled, convolved and binarized. As can be seen in FIG. 5C, the upper right portion of the tip has disappeared. Thus, according to the process in FIG. 3, a prorated trap parameter may be calculated, stored and associated with that portion of the object.

Figure 5D:
Figure 5E:
Figure 5F:
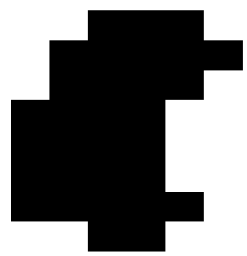

FIGS. 5D, 5E and 5F depict the object after it has been down-sampled, convolved and binarized. As each of the portions of the object disappear through each iteration, prorated trap parameters may be calculated, stored and associated with the disappeared portions of the object.

Further iterations of the process for FIG. 5F yield no further disappearance, and thus processing terminates.

Figure 6:
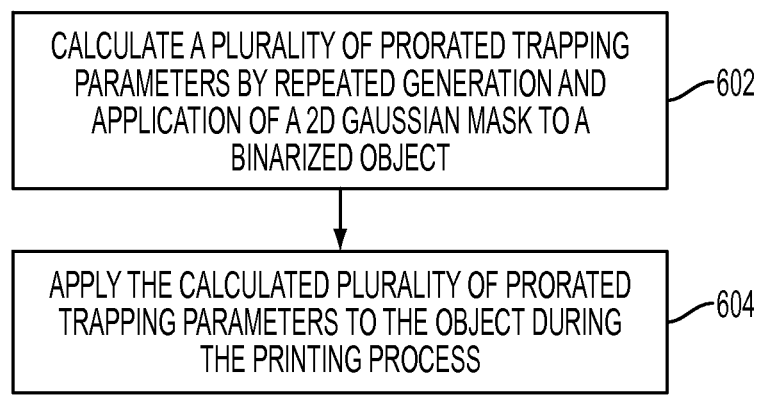
FIG. 6 illustrates an exemplary process flow to calculate a set of trapping parameters in accordance with examples of the present disclosure.

FIG. 6 depicts an example flow diagram of process for identifying a set of trapping parameters to be applied to an object during a printing process. The process depicted in FIG. 6 may be performed, for example, by the processing station 204 depicted in FIG. 2. As can be seen in FIG. 6, a plurality of prorated trapping parameters may be calculated 602. The plurality of prorated trapping parameters may be calculated for the purpose to be applied to portions of an object in a printing process. The calculation may be based on repeated generation and application of a 2D Gaussian mask to a binarized object to identify disappeared portions of the object. Examples of this process are discussed above with regard to FIG. 3.

The calculated plurality of prorated trapping parameters may be applied to the object during the printing process 604.

The 2D Gaussian mask may be generated based on a trap width received via a user interface.

For each repeated generation and application of the 2D Gaussian mask to the binarized object, the binarized object is down-sampled and the 2D Gaussian mask is reduced.

For each repeated generation and application of the 2D Gaussian mask to the binarized object, a convolved binarized object may be compared with the binarized object. It may be determined whether a portion of the binarized object disappeared based on the comparison. If is determined that a portion of the binarized object disappeared based on the comparison, a set of prorated trapping parameters may be calculated and stored, where the set of prorated trapping parameters are to be applied to those portions of the binarized object that were identified as disappeared portions.

Two sets of trap widths may be generated based on a determined trap width. The 2D Gaussian mask to be used may be determined based on selection of trap widths from the generated two sets of trap widths.

Figure 7:
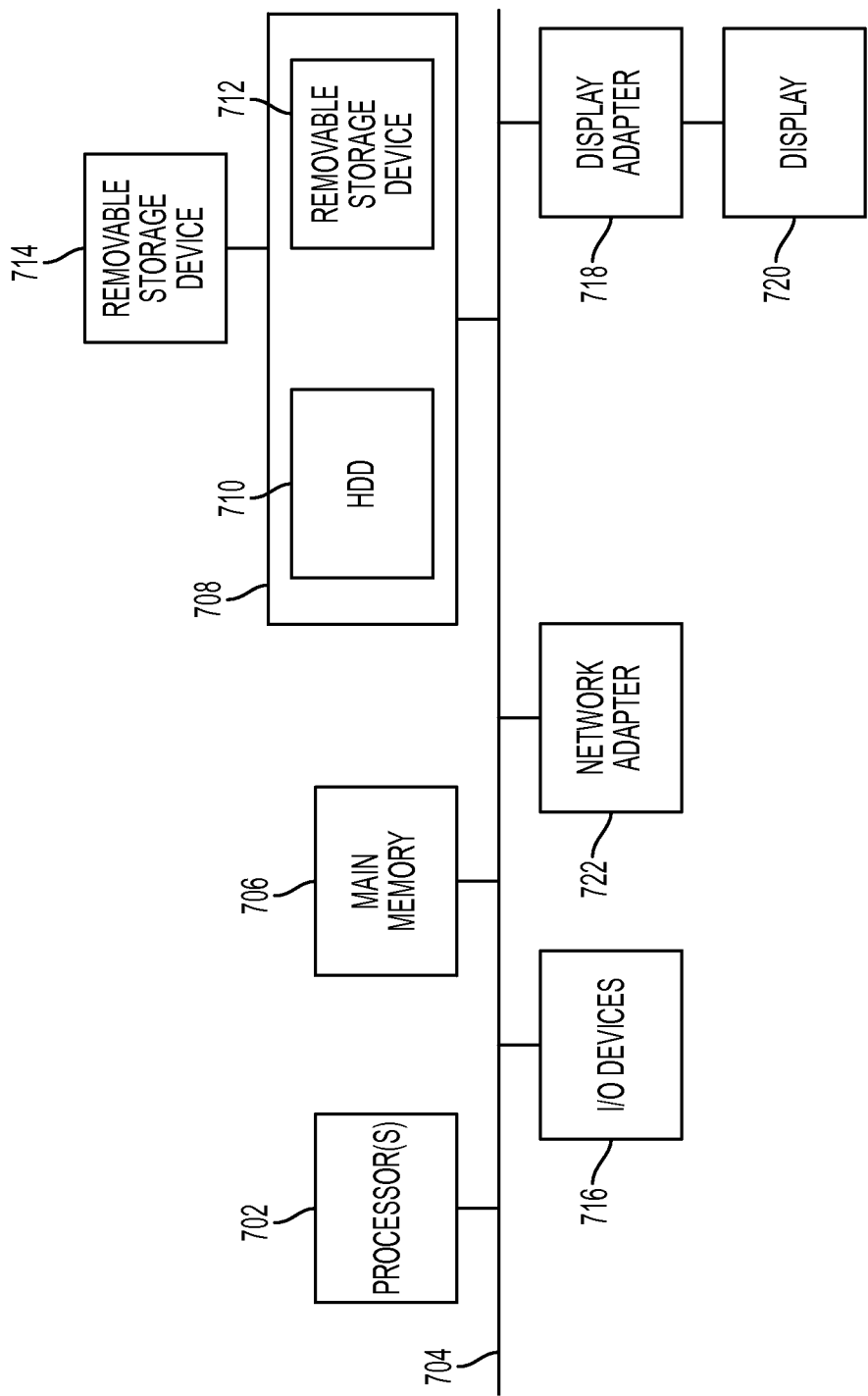
FIG. 7 illustrates an example computing device, in accordance with examples of the present disclosure.

FIG. 7 illustrates a block diagram of some components of a computing apparatus 700, such as the processing station 204 and memory 206 depicted in FIG. 2, according to an example. In this respect, the computing apparatus 700 may be used as a platform for executing one or more of the functions described hereinabove.

The computing apparatus 700 includes one or more processors 702. The processor(s) 702 may be used to execute some or all of the steps described in the method depicted in FIGS. 3 and 6 and among other places in this specification. The processor(s) 702 may be of varying core configurations and clock frequencies. Commands and data from the processor(s) 702 are communicated over a communication bus 704. The computing apparatus 700 also includes a main memory 706, such as a random access memory (RAM), where the program code for the processor(s) 702, may be executed during runtime, and a secondary memory 708. The secondary memory 708 may includes, for example, one or more hard disk drives 710 and/or a removable storage drive 712, representing a floppy diskette drive, a magnetic tape drive, a compact disk drive, etc., where a copy of the program code in the form of non-transitory computer-readable or machine-readable instructions to perform the method depicted in FIGS. 3 and 6 may be stored. The storage device(s) as discussed herein may comprise a combination of non-transitory, volatile or nonvolatile memory such as random access memory (RAM) or read only memory (ROM).

The removable storage drive 710 may read from and/or writes to a removable storage unit 714 in a well-known manner. User input and output devices 716, as also shown, for example, in input device 210 in FIG. 2, may include a keyboard, a mouse, touchpad, touchscreen, a display, etc., for facilitating and enabling human interaction with and manipulation of computing apparatus 700. A display adaptor 718 may interface with the communication bus 704 and the display 720 and may receive display data from the processor(s) 702 and convert the display data into display commands for the display 720. In addition, according to some examples, the processor(s) 702 may communicate over a network, for instance, the Internet, LAN, etc., through a network adaptor 722. Network adaptor may be implemented as one or more network interfaces for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc.

Examples described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a non-transitory computer medium, which include non-transitory computer readable storage devices and media, and signals, in compressed or uncompressed form. Example non-transitory computer readable storage devices and media include computer system RAM (random access memory), ROM (read-only memory), EPROM (erasable, programmable ROM), EEPROM (electrically erasable, programmable ROM), and magnetic or optical disks or tapes.

According to some examples, the components of computing apparatus 700 need not be enclosed within a single enclosure or even located in close proximity to one another. Those skilled in the art will appreciate that the above-described componentry are examples only, as computing apparatus 700 can include any type of hardware componentry, including any necessary accompanying firmware or software, for performing the disclosed embodiments. Computing apparatus 700 can also be implemented in part or in whole by electronic circuit components or processors, such as application-specific integrated circuits (ASICs) or field-programmable gate arrays (FPGAs).

Figure 1A:
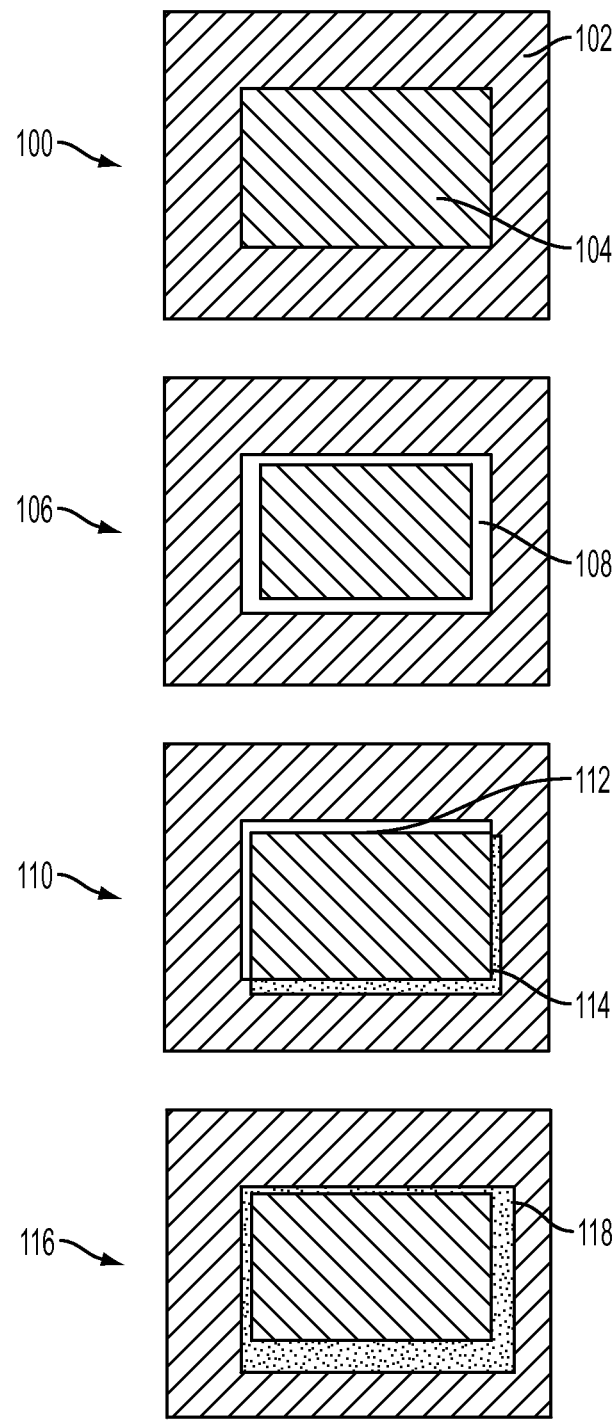
FIG. 1A illustrates an image and examples of how that image may be reproduced.
Figure 1B:
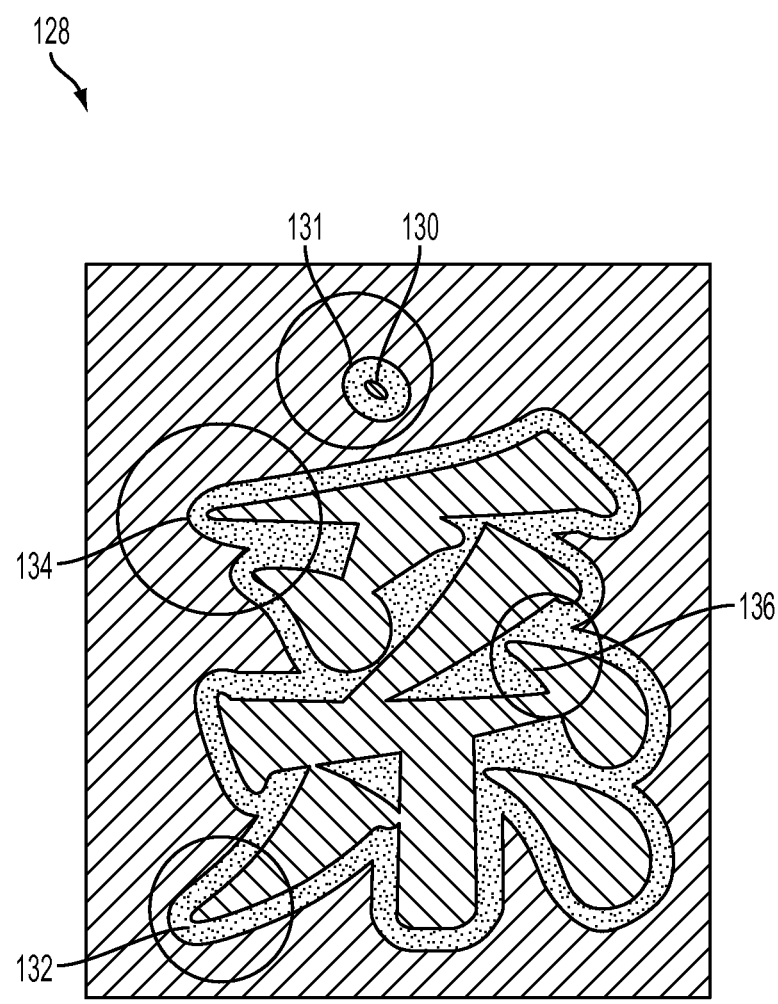
FIG. 1B illustrates an example of how an image may be reproduced.
Figures 8A, 8B:
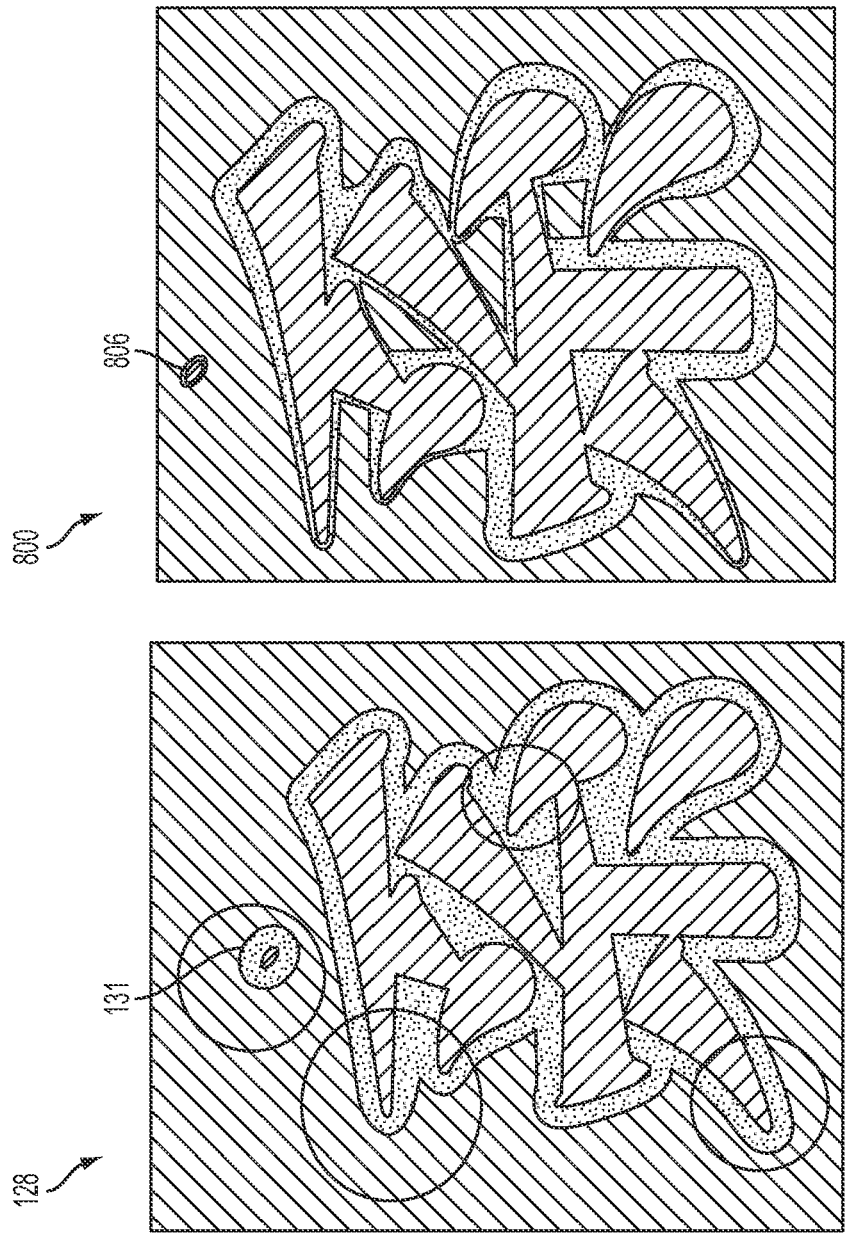
FIGS. 8A-8B illustrates a reproduced image, in accordance with examples of the present disclosure.

FIG. 8A depicts object 128 discussed in FIG. 1B that is reproduced using conventional techniques. Object 800 in FIG. 8B depicts the same object that is reproduced using the processes as discussed herein. As discussed in FIG. 1B, as a uniform trap width is utilized throughout all portions of the object, including at 131, the image quality may be degraded where portions of the image are not of uniform thickness. In contrast, that same portion 802 in object 800 shows improved image quality having a smaller trap width by calculating and applying prorated trap widths to those portions of the object having different thickness.

The foregoing descriptions have been presented for purposes of illustration and description. They are not exhaustive and do not limit the disclosed examples to the precise form disclosed. Modifications and variations are possible in light of the above teachings or may be acquired from practicing the disclosed examples. For example, the described implementation includes software, but the disclosed examples may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Other examples will be apparent to those skilled in the art from consideration of the specification and practice of the examples disclosed herein. The recitations in the claims are to be interpreted broadly based on the language employed in the claims and not limited to examples described in the present specification or during the prosecution of the application, which examples are to be construed non-exclusive. It is intended, therefore, that the specification and examples be considered as example(s) only, with a true scope and spirit being indicated by the following claims and their full scope equivalents.

While the teachings have been described with reference to the examples thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
    convolving a binarized object with a first 2D Gaussian mask based on a determined trap width and generating a convolved binarized object;

comparing the convolved binarized object with the binarized object;

determining that a first portion of the binarized object disappeared based on the comparison; and calculating and storing a first set of trapping parameters to be applied to the disappeared portion of the binarized object;

down-sampling the binarized object to generate a second binarized object;

convolving the second binarized object with a second 2D Gaussian mask based on the determined trap width;

comparing the convolved second binarized object with the second binarized object;

determining whether a second portion of the second binarized object disappeared based on the comparison;

if it is determined that the second portion of the second binarized object disappeared, calculating and storing a second set of trapping parameters to be applied to the second disappeared portion of the second binarized object; and if is determined the second portion of the second binarized object did not disappear, determining whether additional down-sampling should be performed.

2. The method of claim 1, wherein the determined trap width is received via a user interface.

3. The method of claim 1, further comprising:
generating two sets of trap widths based on the determined trap width; and
determining the 2D Gaussian mask to be used in the convolution based on selection of trap widths from the generated two sets of trap widths.

4. The method of claim 1, further comprising:
repeating the down-sampling, convolving, comparing and determining steps until it is determined that no portion disappeared for a predetermined number of repeats.

5. The method of claim 4, further comprising:
calculating a third set of trapping parameters for a remainder of the binarized object that has not disappeared.

6. An apparatus, comprising:
a memory, storing a set of instructions; and
a processor, to execute the stored set of instructions, to:
calculate a plurality of prorated trapping parameters to be applied to portions of an object in a printing process, the calculation being based on repeated generation and application of a 2D Gaussian mask to a binarized object to generate a convolved binarized object and comparing the binarized object to the convolved binarized object to identify disappeared portions of the object; and
apply the calculated plurality of prorated trapping parameters to the object during the printing process,
wherein for each repeated generation and application of the 2D Gaussian mask to the binarized object:
compare a convolved binarized object with the binarized object;
determine that a portion of the binarized object disappeared based on the comparison; and
calculate and store a set of prorated trapping parameters to be applied to the disappeared portion of the binarized object.

7. The apparatus of claim 6, wherein the 2D Gaussian mask is generated based on a trap width received via a user interface.

8. The apparatus of claim 6, wherein for each repeated generation and application of the 2D Gaussian mask to the binarized object, the binarized object is down-sampled and the 2D Gaussian mask is reduced.

9. The apparatus of claim 6, wherein the processor is further to:
generate two sets of trap widths based on a determined trap width; and
determine the 2D Gaussian mask to be used based on selection of trap widths from the generated two sets of trap widths.

10. A non-transitory computer readable storage medium, storing a set of instructions, executable by a processor to:
convolve a binarized object with a first 2D Gaussian mask and generate a convolved binarized object based on a determined trap width;
compare the convolved binarized object with the binarized object;
determine that a first portion of the binarized object disappeared based on the comparison;
calculate and storing a first set of trapping parameters to be applied to the disappeared portion of the binarized object;
down-sample the binarized object to generate a second binarized object;
convolve the second binarized object with a second 2D Gaussian mask based on the determined trap width;
compare the convolved second binarized object with the second binarized object;
determine whether a second portion of the second binarized object disappeared based on the comparison;
if it is determined that the second portion of the second binarized object disappeared, calculate and store a second set of trapping parameters to be applied to the second disappeared portion of the second binarized object; and
if is determined the second portion of the second binarized object did not disappear, determine whether additional down-sampling should be performed.

11. The non-transitory computer readable storage medium of claim 10,
wherein the determined trap width is received via a user interface.

12. The non-transitory computer readable storage medium of claim 10,
wherein the processor is further to:
generate two sets of trap widths based on the determined trap width; and
determine the 2D Gaussian mask to be used in the convolution based on selection of trap widths from the generated two sets of trap widths.

13. The non-transitory computer readable storage medium of claim 10, wherein the processor is further to:
repeat the down-sampling, convolving, comparing and determining steps until it is determined that no portion disappeared for a predetermined number of repeats.

14. The non-transitory computer readable storage medium of claim 12,
wherein the processor is further to:
calculate a third set of trapping parameters for a remainder of the binarized object that has not disappeared.

* * * * *